Patented June 30, 1936

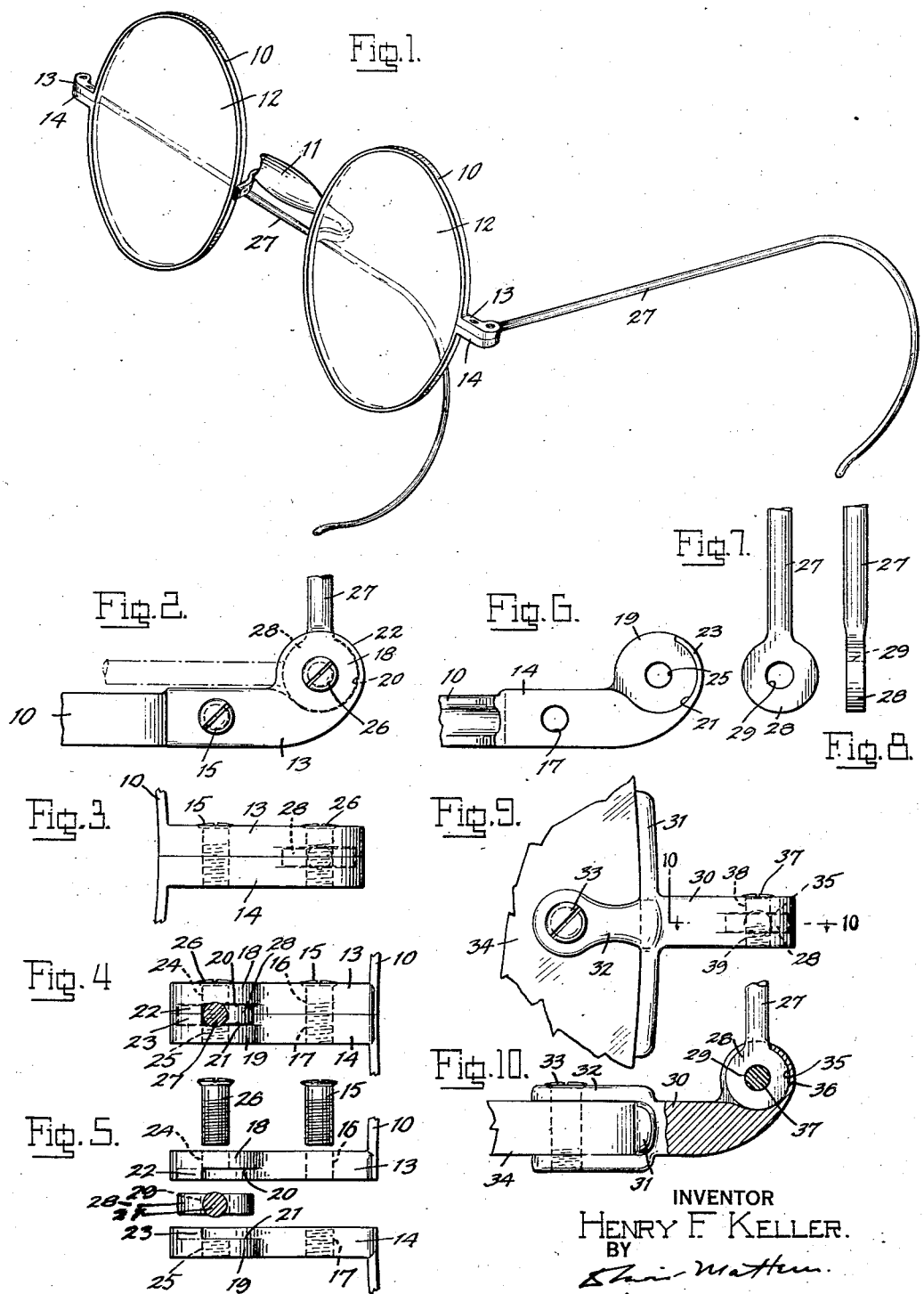

2,046,268

UNITED STATES PATENT OFFICE 2,046,268

OPHTHALMIC MOUNTING

Henry F. Keller, Bridgeport, Conn.

Application July 13, 1935, Serial No. 31,167

1 Claim. (Cl. 88—53)

The present invention relates to an improvement on ophthalmic mountings, and particularly to the hinged temple construction therefor, an object of the invention being to provide a structure by means of which the same form of temple may be used either as a right or left temple, so that the optician need not carry a stock of both right and left temples, as is the case with previous types in which movement limiting lugs were integrally formed on the temples. Also production by the manufacturer is greatly simplified with a saving in time, labor, and tool expense. Another object is to provide a structure in which the end piece will be entirely closed at the front and side so that the same will present a neat appearance, and also in which the joint is entirely closed, both in the extended and folded positions of the temples, against the entrance between the relatively movable parts of dust or grit. A further object is to provide movement limiting stop means cooperating with the temple at a point of relatively great strength, and furthermore in which wear is greatly reduced. A still further object is to provide a construction which will permit the temple to be assembled without the necessity for separating the two sections of the side piece, and therefore without disturbing the mounting of the lens.

With the above and other objects in view, embodiments of the invention are shown in the accompanying drawing and these embodiments will be hereinafter more fully described with reference thereto, and the invention will be finally pointed out in the claim.

In the drawing:—

Fig. 1 is a perspective view of a pair of spectacles in which the end piece and temple construction, according to the invention, is employed.

Fig. 2 is an enlarged top plan view of the end piece at one side, the temple being shown broken away, and also being shown in dot-and-dash lines in the folded position.

Fig. 3 is a front elevation.

Fig. 4 is a rear elevation, the shaft of the temple being shown in section.

Fig. 5 is a rear elevation showing the several parts in separated relation.

Fig. 6 is a plan view of the lower section of the end piece.

Fig. 7 is a plan view of the hinge joint end of the temple.

Fig. 8 is a side view thereof.

Fig. 9 is a front elevation of a modified end-piece, according to the invention, adapted for use with rimless lenses.

Fig. 10 is a horizontal sectional plan view, taken along the line 10—10 of Fig. 9.

Similar reference characters indicate corresponding parts throughout the several figures of the drawing.

Referring to the drawing, and particularly to Figs. 1 to 8 thereof, the rims 10—10 are connected by a nose bridge 11 in the usual manner, and are separable at their outer ends to permit the lenses, 12—12 to be inserted, these separable ends having the upper and lower sections of the end-pieces brazed or otherwise suitably secured thereto, and to which the temples are hingedly connected.

The upper and lower sections 13 and 14 of the end piece are of substantially identical but reversed form, and are clamped together by means of a screw 15 engaged in aligned holes 16 and 17 in the respective sections, the lower hole 17 being threaded, while the upper hole 16 is preferably plain.

The sections 13 and 14 are provided at their outer ends with rearwardly projecting extension portions 18 and 19 of circular outline, and within these portions there are respectively provided circular sockets 20 and 21, the walls 22 and 23 of which extend about the outer ends of the sections to a point in line with the outer side of the shaft of the temple, as will presently more fully appear. The inner side of the socket formed by the sockets 20 and 21 is open to an extent sufficient to permit of the lateral insertion in the socket of the bearing end of the temple. For this purpose the inner circumferential wall surface of the socket is approximately 180° in extent. The portions 18 and 19 are provided centrally with holes 24 and 25 to receive a pivot screw 36, the lower hole 25 being threaded while the upper hole 24 is preferably plain.

The temple comprises a shaft 27, which may be of circular, rectangular, or other suitable cross-section, and a flat circular hinge joint end portion 28, of a diameter to fit snugly and rotatably within the socket of the end piece, and having a central aperture 29 for engagement by the pivot screw 26. The portion 28 is preferably formed by flattening the temple stock so that the point of engagement of the temple with the stop ends of the walls 22 and 23 is at a portion of the temple having the greatest resistance to bending and breakage. Also by engaging the temple with the end wall at the side of the pivot toward the ear-engaging end of the shaft there is no compounding of the leverage to impose increased strain on the stop means, as is the case in certain constructions heretofore in use where the stop means is at the side of the pivot away from the ear engaging end.

The construction according to the invention provides an efficient temple joint of simple construction and assembly permitting the same temple to be used either at the right or left. The structure is furthermore neat in appearance, the movable contacting surfaces are such that wear is greatly reduced, and there are no openings, either in the extended or folded positions of the temples, for the lodgment of dirt and grit.

In Figs. 9 and 10, I have shown a modification of the invention adapted to the end pieces of rimless eye-glasses. In this case the end piece 30 is of one piece, and is provided with a brace 31, clamp 32, and screw 33 for attaching the lens 34. The end piece is of the same general form as that of the first described embodiment, a socket 35 being milled or otherwise formed therein and having a circumferential enclosing and stop wall 36 similar to the wall 22—23 of said first embodiment. The temple is pivotally secured by a screw 37 engaged in holes 38 and 39 in the upper and lower walls of the socket and passing through the aperture 29 of the temple.

I have illustrated and described preferred and satisfactory embodiments of the invention, but it will be obvious that changes may be made therein, within the spirit and scope thereof, as defined in the appended claim.

Having thus described my invention what I claim and desire to secure by Letters Patent is:—

An ophthalmic mounting comprising a metallic temple supporting member having a socket therein, said socket being defined by an upper interiorly flat lateral wall, a lower interiorly flat lateral wall, and a circumferential side wall extending partially about said socket from the forward to the rearward side of said supporting member and having an inner circumferential bearing wall surface concentric to the central axis of said socket, the rearward end of said wall constituting a temple movement limiting stop, a temple having a shaft and a centrally apertured laterally disposed circular flat bearing end, of a diameter substantially greater than the lateral thickness dimension of said shaft and of a vertical thickness substantially corresponding to the vertical dimension of said socket, disposed in said socket with its peripheral surface slidably engaging said circumferential bearing wall surface and its upper and lower flat surfaces slidably engaging said flat lateral walls of said socket whereby said interior lateral and circumferential surfaces of said socket are at all times slidably engaged by said bearing end to completely close said socket against entrance of dirt, and a removable pivot pin pivotally engaging the aperture of said bearing end and securing said bearing end within said socket for rotary movement about the central axis of said socket, said temple adapted to engage said end of said wall in one limit position at a point contiguous to said bearing end, said socket having a laterally disposed open side opposed to said circumferential bearing wall surface of a width greater than the diameter of said bearing end, whereby said bearing end may be laterally engaged with and disengaged from said socket upon the removal of said pivot pin.

HENRY F. KELLER.